INVENTORS
RICHARD H. BERGMAN
ELDON C. CORNISH &
MELVIN M. KAUFMAN
BY John V. Regan
ATTORNEY INVENTORS
RICHARD H. BERGMAN,
ELDON C. CORNISH &
MELVIN M. KAUFMAN
BY John V. Regan
ATTORNEY 3,133,206

LOGIC CIRCUIT HAVING BISTABLE TUNNEL DIODE RESET BY MONOSTABLE DIODE

Richard H. Bergman, Riverton, Eldon C. Cornish, Pennsauken, and Melvin M. Kaufman, Merchantville, N.J., assignors to Radio Corporation of America, a corporation of Delaware Filed June 7, 1960, Ser. No. 34,439
9 Claims. (Cl. 307—88.5)

This application relates to a new and improved logic circuit for digital computers or the like. More particularly, the application relates to a negative resistance diode logic circuit.

An object of the invention is to provide a simple "and-or" circuit which is capable of operating at high speeds.

Another objective of the invention is to provide a logic circuit which automaticaly resets when the logic operation is completed.

The circuit of the invention includes a first negative resistance diode circuit having two stable operating states and a second negative resistance diode circuit having one stable operating state and which overshoots when returning to its one stable state. A coupling circuit interconnects the two negative resistance diode circuits. When the bistable circuit switches from a given one of its stable states to another, the coupling circuit supplies sufficient energy to the monostable circuit to switch the latter out of its one stable operating state, and when the monostable circuit overshoots when returning to its one stable state, the coupling circuit feeds back sufficient energy to the bistable circuit to reset the latter to its given stable state.

The circuit and its mode of operation are illustrated in the drawings described briefly below and are explained in more detail in the explanation following the description of the drawings.

Figure 1:
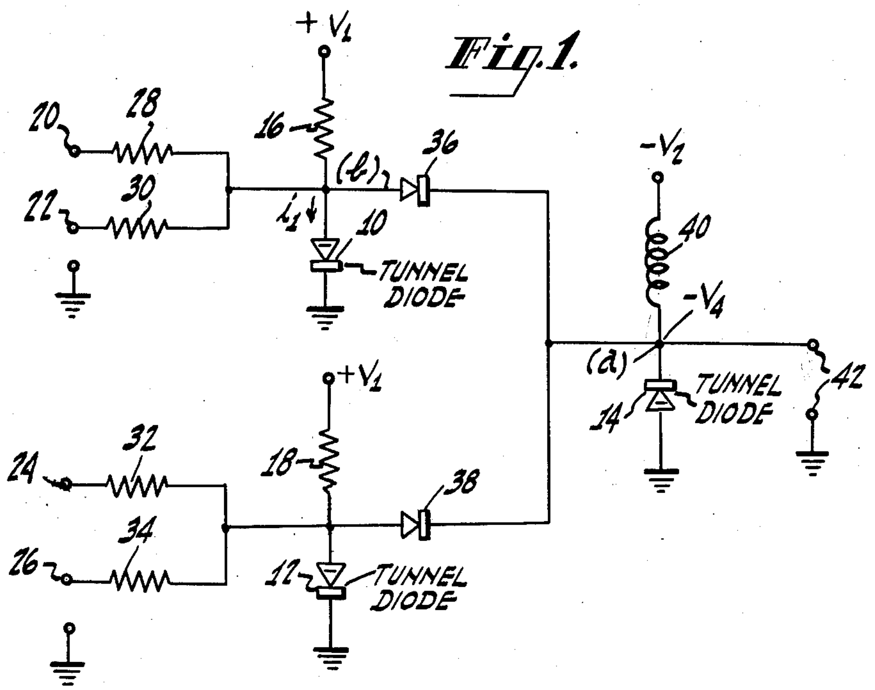
FIG. 1 is a schematic circuit diagram of a preferred form of the invention.

Diodes 10, 12 and 14 in FIG. 1 are negative resistance diodes of the voltage controlled type known as "tunnel diodes." These diodes have two positive resistance operating regions, one in a lower voltage range and the other in a higher voltage range, and a negative resistance operating region between the two positive resistance operating regions. The lower voltage positive resistance operating region is hereafter termed the "low state" of the diode and the higher voltage positive resistance operating region is hereafter termed the "high state" of the diode. In the circuit of FIG. 1, the anodes of diodes 10 and 12 are connected through resistors 16 and 18, respectively, to a source of positive voltage legended $+V_1$. Resistances 16 and 18 have a sufficiently high value compared to that of the diode that the voltage source $V_1$ plus resistance can be considered to be a constant current source. The cathodes of diodes 10 and 12 are connected to a point of reference potential, shown as ground on the drawing.

The input terminals to diode 10 are shown at 20 and 22, and those for diode 12 are shown at 24 and 26. Terminals 20, 22, 24, and 26 are connected to the anodes through coupling resistors 28, 30, 32 and 34, respectively.

Diodes 36 and 38 are conventional positive resistance diodes. They couple the output of tunnel diodes 10 and 12 taken from the anodes thereof to the cathode of tunnel diode 14. The voltage supply for tunnel diode

14 is indicated schematically by the symbol $-V_2$ and it is connected through an inductance 40 to the cathode of tunnel diode 14. The output from the circuit may be taken at terminals 42, one of which is connected to the cathode of tunnel diode 14 and the other of which is connected to ground.

Figure 2:
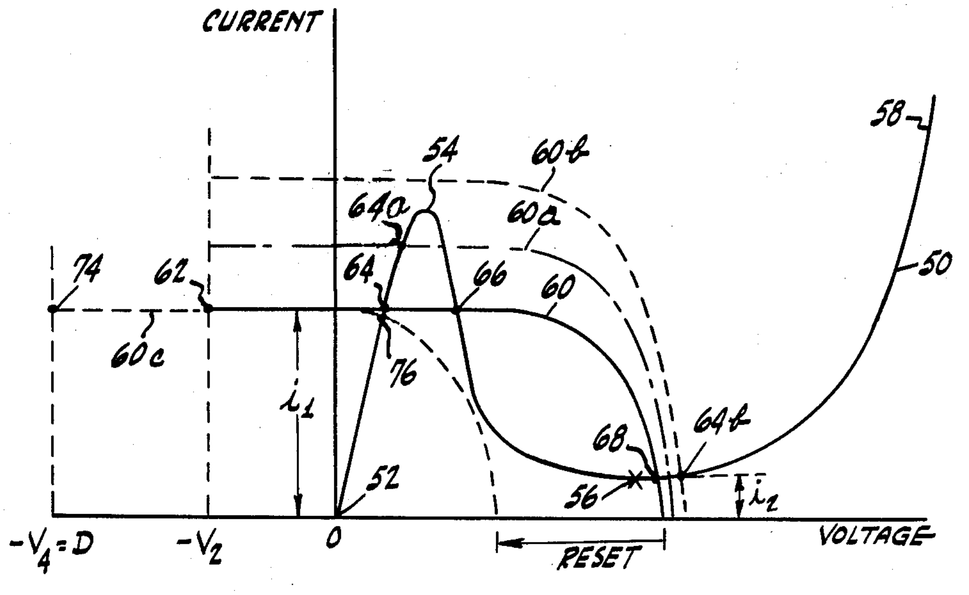
FIGS. 2 and 3 are characteristics of current versus voltage for the bistable and monostable negative resistance diode circuits, respectively, shown in FIG. 1.
Figure 3:
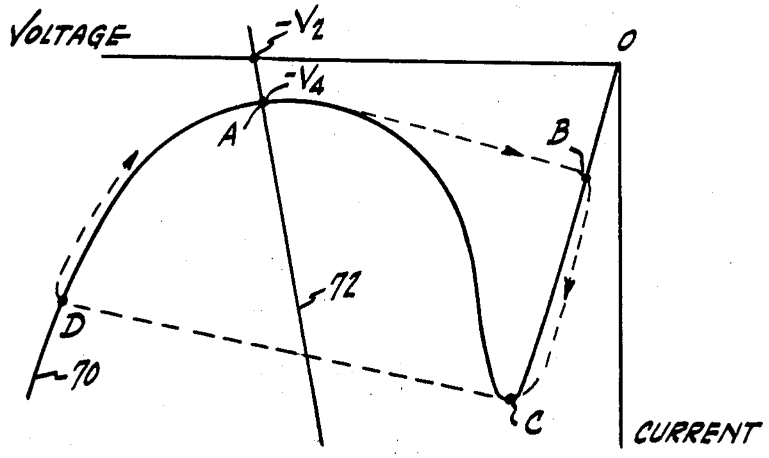
Figure 4:
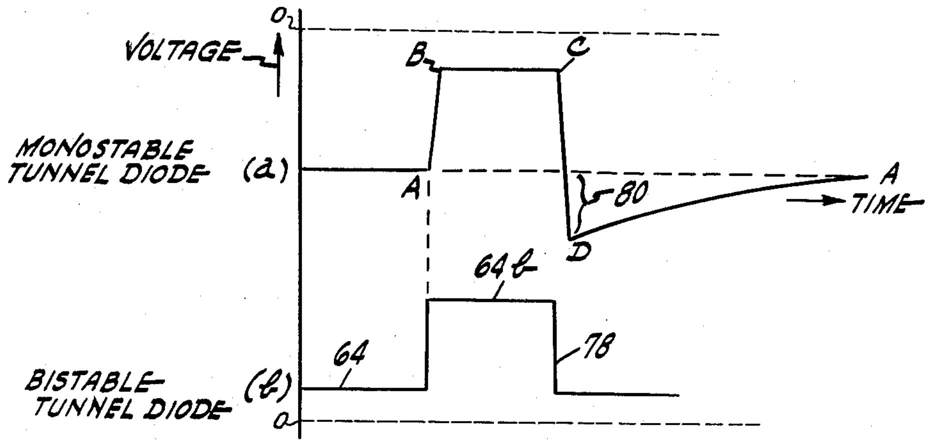
FIG. 4 is a drawing of waveforms present at various points in the circuit of FIG. 1.

The operation of the circuit may be better understood by referring to FIGS. 2–4. Since the operation is the same for both tunnel diodes 10 and 12, only tunnel diode 10 and its associated circuit elements are discussed in detail. The characteristic of current versus voltage for a typical tunnel diode 10 is shown at 50 in FIG. 2. The region 52—54 of this characteristic is the low voltage state of the diode and the region 56—58 is the high voltage state of the diode. Conventional diode 36 is considered to be a load on tunnel diode 10 for the purposes of the present explanation. The load line for diode 36 is shown at 60. Since the cathode of diode 36 is maintained at a voltage $-V_2$, the origin 62 of characteristic 60 appears at a voltage $-V_2$ in FIG. 2. There are three intersections between load line 60 and tunnel diode characteristic 50, namely 64, 66 and 68. Intersections 64 and 68 are in the low and high states of the tunnel diode and, accordingly, are stable operating points; however, intersection 66 is in the negative resistance operating region and is unstable. It may be assumed that initially the diode is operating in its low voltage state. The current drawn by the tunnel diode $i_1$ is relatively high whereas the current flowing into the conventional diode 36 is relatively low.

The quiescent bias applied to tunnel diode 10 is such as to require the coincidence of two positive pulses to switch the tunnel diode from its low state to its high state. Thus, the circuit of tunnel diode 10 may be considered to be an "and" circuit, that is, two binary "ones" (positive pulses) are required to produce a binary "one" (high voltage) output. For example, if a single positive pulse is applied to terminal 20 of the circuit, the load line 60 moves to position **60*a*. The operating point is now at 64*a*, a slightly larger current value than at operating point 64 and at approximately the same voltage as operating point 64. If two positive pulses are concurrently applied to input terminals 20 and 22, the effect is to shift the load line 60 to position 60*b*. It may be observed that there is now no longer a stable intersection between the portion of the tunnel diode curve representing the low voltage state of tunnel diode 10 and the shifted load line 60*b*. However, there is an intersection at 64*b* between the shifted load line 60*b* and the characteristic curve 50. Accordingly, when two positive pulses are applied to the tunnel diode 10, it switches from its low state to its high state and a binary "one" appears at the anode of the tunnel diode 10**.

It may be observed in FIG. 2 that at operating point **64*b*, the current $i_2$ into the tunnel diode 10 is relatively low, the voltage across the tunnel diode 10 is relatively high, and the current into the conventional coupling diode 36 is relatively high. The increased voltage at the anode of tunnel diode 10 is applied through coupling diode 36 to the cathode of tunnel diode 14. The additional current passing through coupling diode 36 is largely available for driving the load (not shown) connected to terminals 42**.

The characteristic of current versus voltage for the third tunnel diode 14 is shown at 70 in FIG. 3. The curve is inverted because the tunnel diode is poled oppositely to first tunnel diode 10. The resistance of inductor 40 plus the internal resistance of the source of voltage $-V_2$ are sufficiently small compared to that of the third tunnel diode 14 that the third tunnel diode may be said to be quiescently biased from a constant voltage source. The load line for this source is as illustrated at 72 in FIG. 3.

The intersection with the voltage axis is $-V_2$ and the quiescent operating point is at A in the valley region of the high state of tunnel diode 14. There is only one stable intersection between load line 72 and the tunnel diode characteristic and, accordingly, this tunnel diode circuit is said to be monostable. If the input voltage to the tunnel diode changes a sufficient amount in the reverse direction, the operating point switches from point A to point B and subsequently switches back along path BCDA to its stable intersection A.

As already mentioned, when first tunnel diode 10 switches from its low voltage state to its high voltage state, the current through coupling diode 36 increases and the voltage applied by the coupling diode to the tunnel diode 14 is in a sense to drive the cathode of tunnel diode 14 less negative. In other words, the effect of the increased voltage at the anode of tunnel diode 10 is to switch the third tunnel diode from its monostable operating point A into the negative resistance region toward point B.

When the tunnel diode 14 switches from operating point A to B, the voltage at the cathode of this tunnel diode becomes less negative (goes from a value of −350 to −400 millivolts or so to a value of −10 to −30 millivolts or so). The effect of this change in voltage is to decrease the current flow through coupling diode 36. Thus, at operating point B (and also during the operation from B to C) diode 36 effectively decouples tunnel diode 14 from tunnel diode 10. Diode 38 performs the same function with respect to tunnel diode 12.

The time required for the current through the diode to increase from the value indicated at B to the one indicated at C depends upon the time constant of the circuit. This is substantially equal to $L/R$, where L is the inductance of inductor 40 and R is the resistance of the tunnel diode 14 in the region BC.

When the operating point C is reached, tunnel diode 14 switches from its low voltage state through the negative resistance region to point D in its high voltage state. The voltage at point D is substantially more negative than that at point A and is the correct direction substantially to forward bias diode 36. The effect of the increased negative voltage at the cathode of the third tunnel diode 14 is illustrated in FIG. 2 as a shift in the load line to the left. The shifted load line is shown at *60c*. The origin 74 of this load line now lies at a voltage D (a voltage more negative than $-V_2$) and the intersection of this load line *60c* with the current versus voltage characteristic of tunnel diode 10 is at operating point 76. This intersection 76 is the only positive resistance region intersection between the load line and the characteristic of the first tunnel diode 10 so that tunnel diode 10 automatically is reset to its low state.

Returning to the operation of the third tunnel diode 14, after voltage D is reached, the voltage across the diode becomes less negative, and the current through the diode decreases until operating point A is again reached. Again the time required to go from operating point D to A (FIG. 3) depends upon the circuit time constant. Operating point A is, of course, the monostable operating point of tunnel diode 14.

The waveforms present in the circuit are illustrated in FIG. 4. The waveform shown in FIG. 4*a* is the voltage wave across third tunnel diode 14. The points A, B, C and D correspond to the similarly legended operating points in FIG. 3. The voltage across the bistable tunnel diode such as 10 or 12 is as shown in FIG. 4*b*. The region 64 corresponds to operation in the low voltage state 64 of the diode as is indicated in FIG. 2. The region *64b* corresponds to operation in the high voltage state of the diode as is indicated at *64b* or 68 in FIG. 2. The lagging edge 78 of the curve of FIG. 4*b* is the resetting of the tunnel diode by the overshoot portion 80 of the monostable tunnel diode output wave. The input pulses to the bistably operated diodes are not shown, however, they are positive and may be of shorter duration than the pulse shown in FIG. 4*b*.

In the circuit of FIG. 1, the input terminals 20—26 may be connected to some previous tunnel diode stage and therefore may be quiescently biased at some level of voltage other than ground. In one form of the invention, for example, these terminals may be at a slightly negative voltage. Also, although the anode of tunnel diode 14 is shown connected to ground it may be desirable in certain circuits to forward bias the anode of the tunnel diode slightly.

The circuit of FIG. 1 includes two "and" gates connected to one "or" gate. There may be more or fewer than two "and" gates so connected. Also, the diodes 10 and 12 may be reversed in polarity and connected to negative rather than positive supply voltages. In this case, the input pulses may be negative and the polarity of the monostably operated diode 14 and coupling diodes may also be reversed. It is also possible quiescently to bias the bistable diodes in their high states and to so pole and bias the monostable diode so that the overshoot of the latter resets the bistable diodes to their high states.

In a circuit which was successfully operated, some of the following circuit components were used. The tunnel diodes 10, 12 and 14 were gallium arsenide tunnel diodes. They had current peaks between about 40 and 50 milliamperes at voltages between about 100 and 115 millivolts and current valleys at roughtly 400 millivolts. Resistors 16 and 18 may be between about 50 and 100 ohms. Resistors 28—34 may be of roughly the same order of magnitude. These values are merely illustrative and are not meant to be limiting.

What is claimed is:

1. In combination, a first negative resistance diode circuit having two stable operating states; a second negative resistance diode circuit having one stable operating state and which overshoots when returning to said one stable state; and a coupling circuit interconnecting said two negative resistance diode circuits in such manner that when the bistable circuit switches from a given one of its stable states to the other, it applies sufficient energy through the coupling circuit to the second circuit to switch the second circuit out of its one stable operating state, and when the second circuit overshoots in returning to its one stable state, the second circuit feeds back sufficient energy to the first circuit through the coupling circuit to reset the first circuit to its given stable state.

2. In combination, a first negative resistance diode circuit having two stable voltage states; a second negative resistance diode circuit having one stable voltage state and which overshoots when returning to said stable state; and a coupling circuit interconnecting said two negative resistance diode circuits in such manner that when the bistable circuit switches from a given one of its stable states to the other, it applied sufficient voltage through the coupling circuit to the second circuit to switch the second circuit out of its one stable operating state, and when the second circuit overshoots in returning to its one stable state, the second circuit feeds back a voltage through the coupling circuit to the first circuit to reset the latter to its given stable state.

3. In combination, a first voltage controlled negative resistance diode circuit having two stable operating states; a second voltage controlled negative resistance diode circuit having one stable operating state and which overshoots when returning to said stable state; and a uindirectionally conducting coupling circuit interconnecting the anode of one diode to the cathode of the other in such manner that when the bistable circuit switches from a given one of its stable states to the other, it applies sufficient voltage through the coupling circuit to the second circuit to switch the second circuit out of its one stable operating state, and when the second circuit overshoots in returning to its one stable state, the second circuit feeds back sufficient voltage to the first circuit through the coupling circuit to reset the first circuit to its given stable state.

4. In combination, a first tunnel diode circuit having two stable operating states; a second tunnel diode circuit having one stable operating state and which overshoots when returning to said one stable state; and a positive resistance diode interconnecting the anode of one tunnel diode to the cathode of the other tunnel diode and poled to conduct current in the forward direction from the first circuit to the second at a level sufficient to switch the second circuit out of its one stable operating state when the first circuit switches from its quiescent stable state to its other stable state and, when the second circuit overshoots in returning to its one stable state, said second circuit feeding back sufficient voltage through said positive resistance diode to the first circuit to reset the latter to its quiescent stable state.

5. In combination, a bistably operated first tunnel diode quiescently biased in one of its voltage states; a monostably operated second tunnel diode quiescently biased in the valley region of its high voltage state; and a positive resistance third diode connected between the anode of one of said tunnel diodes to the cathode of the other and poled to be forward biased by the voltages present at said anode and cathode.

6. In the combination as set forth in claim 5, said first tunnel diode having a plurality of signal input terminals and the quiescent bias on said diode being such that coincident pulses at said terminals are required to switch said first diode to its other voltage state.

7. In combination, a bistably operated first tunnel diode quiescently biased to operate in its low voltage state; a monostably operated second tunnel diode quiescently biased to operate in the valley of its high voltage state, the voltage across the second tunnel diode being of opposite polarity than that across the first tunnel diode; and a positive resistance diode connected between the anode of the first tunnel diode and the cathode of the second and poled so that the voltages at said anode and cathode forward bias said positive resistance diode.

8. An "and-or" circuit comprising a plurality of first tunnel diode circuits, each capable of operating in one of two stable states and each quiescently biased to the low voltage state; a second tunnel diode circuit having one stable operating state and quiescently biased in the valley region of the high voltage state, the tunnel diode in said second circuit being poled oppositely from the tunnel diodes in the first circuit; and a plurality of coupling means, one for each first circuit, for connecting said first circuits to said second circuits.

9. An "and-or" circuit comprising a plurality of first tunnel diode circuits, each capable of operating in one of two stable states and each quiescently biased to the low voltage state; a second tunnel diode circuit having one stable operating state and quiescently biased in the valley region of the high voltage state, the tunnel diode in said second circuit being poled oppositely from the tunnel diodes in the first circuit; and a plurality of positive resistance diodes, one for each first circuit, each connecting a tunnel diode in the first circuit to the tunnel diode in the second circuit, and each said positive resistance diode being poled to be forward biased by the voltages present at the tunnel diodes it connects.

References Cited in the file of this patent

UNITED STATES PATENTS

| | | |
|---|---|---|
| 2,944,164 | Odell et al. | May 13, 1954 |
| 3,075,088 | Kam Li | Jan. 22, 1963 |
| 3,078,376 | Lewin | Feb. 19, 1963 |

OTHER REFERENCES

AIIE Conference Paper No. CP-60-297, entitled "Tunnel Diode Circuit Aspects and Applications," by Chow et al., January 1960, paginations as follows: pages 7, 19, 22, 26 and 27.

"Electrical Engineering," Tunnel Diode Operating and Applications, by Lesk et al., pages 270–277, pages 275 and 276 referred to.

"Solid-State Microwave High Speed Computers," by Rajchman pages 38 to 46 in Proceedings of the Eastern Joint Computer Conferences, Dec. 1–3, 1959.

"Negative-Resistance Elements as Digital Computer Components," by Lewin, in Proceedings of the Eastern Joint Computer Conferences, Dec. 1–3, 1959.

"The Tunnel Diode as A Logic Element," by Lewin et al., in 1960, International Solid-State Circuits Conference, pages 10 and 11, Feb. 10, 1960.

"Diode Logic Circuits," by Neff et al., in 1960 International Solid-State Circuits Conference, pages 16 and 17.